(12) United States Patent
Sotani

(10) Patent No.: US 8,943,918 B2
(45) Date of Patent: Feb. 3, 2015

(54) POWER UNIT FOR A VEHICLE

(75) Inventor: Hiroshi Sotani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 483 days.

(21) Appl. No.: 12/882,440

(22) Filed: Sep. 15, 2010

(65) Prior Publication Data

US 2011/0072924 A1 Mar. 31, 2011

(30) Foreign Application Priority Data

Sep. 29, 2009 (JP) ................................. 2009-225476

(51) Int. Cl.
 *F16H 3/08* (2006.01)
 *F16D 7/00* (2006.01)
 *F16H 55/14* (2006.01)

(52) U.S. Cl.
 CPC .................................... *F16H 55/14* (2013.01)
 USPC .................................. 74/331; 74/411; 464/39

(58) Field of Classification Search
 USPC .......... 74/411, 461, 567, 56, 57, 331; 464/38, 464/39
 See application file for complete search history.

(56) References Cited

U.S. PATENT DOCUMENTS

| | | | | |
|---|---|---|---|---|
| 4,559,023 A | * | 12/1985 | Uchibaba et al. | 464/30 |
| 4,635,506 A | * | 1/1987 | Imaizumi et al. | 74/745 |
| 4,655,309 A | * | 4/1987 | Imaizumi et al. | 180/215 |
| 6,280,332 B1 | * | 8/2001 | Knutson | 464/59 |
| 7,143,734 B1 | * | 12/2006 | Leppanen et al. | 123/192.1 |
| 7,467,562 B2 | * | 12/2008 | Nomura et al. | 74/331 |
| 7,793,751 B2 | * | 9/2010 | Stevens | 180/336 |
| 8,191,443 B2 | * | 6/2012 | Inui et al. | 74/473.22 |
| 2002/0032060 A1 | * | 3/2002 | Hojyo et al. | 464/39 |
| 2011/0072924 A1 | * | 3/2011 | Sotani | 74/411 |

FOREIGN PATENT DOCUMENTS

| | | | |
|---|---|---|---|
| JP | 59-191453 | * | 12/1984 |
| JP | 59-191453 U | | 12/1984 |

\* cited by examiner

*Primary Examiner* — Troy Chambers
*Assistant Examiner* — Emily Cheng
(74) *Attorney, Agent, or Firm* — Birch, Stewart, Kolasch & Birch, LLP

(57) ABSTRACT

A power unit for a vehicle includes a buffering device provided on a final shaft parallel to a countershaft of a speed change gear. The buffering device includes a damper gear wheel supported for relative rotation on the final shaft, a lifter coupled against relative rotation but for relative movement in an axial direction on the final shaft and engaged by a cam provided on one face of the damper gear wheel, a spring retainer supported at a position on the final shaft spaced apart from the lifter, and a coil spring provided between the lifter and the spring retainer for biasing the lifter toward the damper gear wheel. The buffering device is disposed on the final shaft and positioned between a pair of imaginary planes, the pair of imaginary planes extending perpendicularly to an axial line of the idle shaft and passing opposite ends of the idle shaft.

11 Claims, 4 Drawing Sheets

POWER UNIT FOR A VEHICLE

CROSS-REFERENCE TO RELATED APPLICATIONS

This nonprovisional application claims priority under 35 U.S.C. §119(a) on Patent Application No. 2009-225476, filed in Japan on Sep. 29, 2009, the entirety of which is incorporated herein by reference.

BACKGROUND OF THE INVENTION

1. Field of the Invention

This invention relates to a power unit, and more particularly to a power unit for a vehicle.

2. Background of the Invention

As disclosed in Japanese Utility Model Laid-Open No. Sho 59-191453, in a power unit for a vehicle, a buffering device is provided between a countershaft of a speed change gear and a final shaft parallel to the countershaft. The buffering device includes a damper gear to which rotational power from the countershaft is transmitted, a lifter engaged by a cam provided on one face of the damper gear, a spring retainer supported on the final shaft, and a coil spring provided between the lifter and the spring retainer for exerting spring force for biasing the lifter toward the damper gear side.

However, in the power unit for a vehicle disclosed in Japanese Utility Model Laid-Open No. Sho 59-191453, the final shaft has a length increased by an amount of the space in which the buffering device is disposed. This increases the size of the power unit.

SUMMARY OF THE INVENTION

It is an object of the present invention to provide a power unit for a vehicle which prevents the length of a final shaft, on which buffering device is provided, from becoming greater than a necessary length, and makes the power unit compact while making it possible for rotational power in the reverse direction from a countershaft to be transmitted to the final shaft through a reverse gear train.

In order to achieve the object described above, according to according to a first aspect the present invention, a power unit for a vehicle includes a buffering device provided on a final shaft parallel to a countershaft of a speed change gear which is configured to change a speed resulting from rotational power inputted from an engine stepwise. The buffering device includes a damper gear wheel supported for relative rotation on the final shaft, a lifter coupled against relative rotation but for relative movement in an axial direction on the final shaft and engaged by a cam provided on one face of the damper gear wheel, a spring retainer supported at a position on the final shaft spaced apart from the lifter, and a coil spring provided between the lifter and the spring retainer in such a manner as to exert spring force for biasing the lifter toward the damper gear wheel. The power unit carries out changeover between a state where the rotational power in a forward direction from the countershaft is transmitted to the damper gear wheel and another state wherein the rotational power in a reverse direction from the countershaft is transmitted to the damper gear wheel through a reverse gear train including idle gear wheels supported for rotation on the countershaft and an idle shaft extending in parallel to the final shaft. The buffering device is disposed on the final shaft and positioned between a pair of imaginary planes, the pair of imaginary planes extending perpendicularly to an axial line of the idle shaft and passing opposite ends of the idle shaft.

According to a second aspect of the present invention, the spring retainer is formed in such a manner as to have an arm-like portion whose end adjacent the lifter is spline coupled to the final shaft and which is open to the opposite side to the lifter, and a flange portion connecting to an outer periphery of the open end of the arm-like portion in such a manner as to receive the coil spring. A positioning member which engages with the spring retainer from the opposite side to the coil spring is mounted on the final shaft and disposed in the arm-like portion.

According to a third aspect of the present invention, a bearing member which overlaps at least at part thereof with the arm-like portion as viewed in a direction perpendicular to the axial line of the final shaft is interposed between the final shaft and a shaft supporting member which supports the final shaft for rotation thereon.

According to a fourth aspect of the present invention, the bearing member is a needle bearing.

According to a fifth aspect of the present invention, the idle shaft is disposed at a position above the buffering device at which the idle shaft overlaps at least at part thereof with the buffering device as viewed in plan, and a lubricating oil path for supplying oil therethrough to a location between the idle shaft and the idle gear wheels supported for rotation on the idle shaft is provided coaxially in the idle shaft.

According to a sixth aspect of the present invention, part of the buffering device is disposed between two straight lines extending downwardly from the opposite ends of the idle shaft in a horizontal direction on a projection view to a plane perpendicular to the axial lines of the final shaft and the idle shaft.

It should be noted that the second crankcase cover 15 in the embodiment corresponds to the shaft supporting member in the present invention, the needle bearing 70 in the embodiment corresponds to the bearing member in the present invention, the retaining ring 93 in the embodiment corresponds to the positioning member in the present invention, and the first lubricating oil path 96 in the embodiment corresponds to the lubricating oil path in the present invention.

According to the first aspect of the present invention, since the buffering device is disposed at a position on the final shaft at which it overlaps with the idle shaft as viewed in a direction along a straight line which passes the axial line of the final shaft and the idle shaft, it can suppress the length of the final shaft from becoming greater than a necessary length and make the power unit compact while making it possible for rotational power in the reverse direction from the countershaft to be transmitted to the final shaft through the reverse gear train.

According to the second aspect of the present invention, the positioning member mounted on the final shaft and the arm-like portion in such a manner as to be open to the opposite side to the lifter engages with the spring retainer from the opposite side to the coil spring. Therefore, the space occupied by the buffering device in the axial direction of the final shaft can be set small.

According to the third aspect of the present invention, since the bearing member interposed between the final shaft and the shaft supporting member overlaps at least at part thereof with the arm-like portion as viewed in a direction perpendicular to the axial line of the final shaft, the axial length of the final shaft can be made short by accommodating at least part of the bearing structure of the final shaft in the arm-like portion.

According to the fourth aspect of the present invention, since the bearing member is a needle bearing, the inner diameter of the arm-like portion can be set small, and the space occupied by the buffering device in a radial direction of the final shaft can be made small.

According to the fifth aspect of the present invention, the idle shaft supporting the idle gear wheels of the reverse gear train is disposed at a position above the buffering device at which the idle shaft overlaps at least at part thereof with the buffering device as viewed in plan, and the lubricating oil path for supplying oil therethrough to the location between the idle shaft and the idle gear wheels is provided in the idle shaft. Therefore, it is possible to allow oil, which has lubricated the idle gear wheels, to drop to the buffering device side, and the buffering device can be lubricated while making it unnecessary to provide an oil path for supplying oil to the buffering device therethrough in the final shaft.

According to the sixth aspect of the present invention, part of the buffering device is disposed between two straight lines extending downwardly from the opposite ends of the idle shaft in a horizontal direction on a projection view to a plane perpendicular to the axial lines of the final shaft and the idle shaft. This can contribute to compaction of the power unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
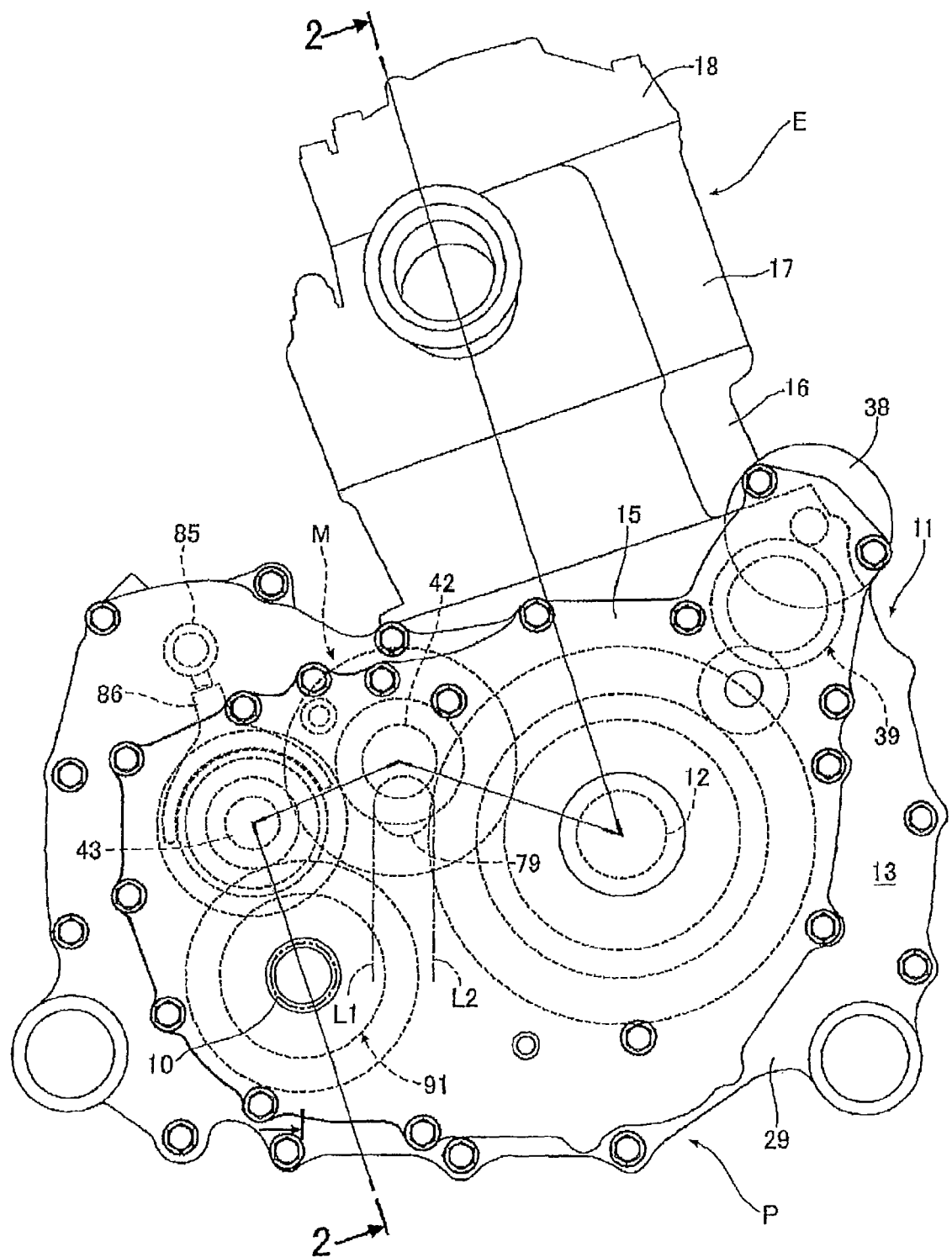
FIG. 1 is a rear elevational view of an internal combustion engine as viewed from the rear side of a vehicle according to an embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 2:
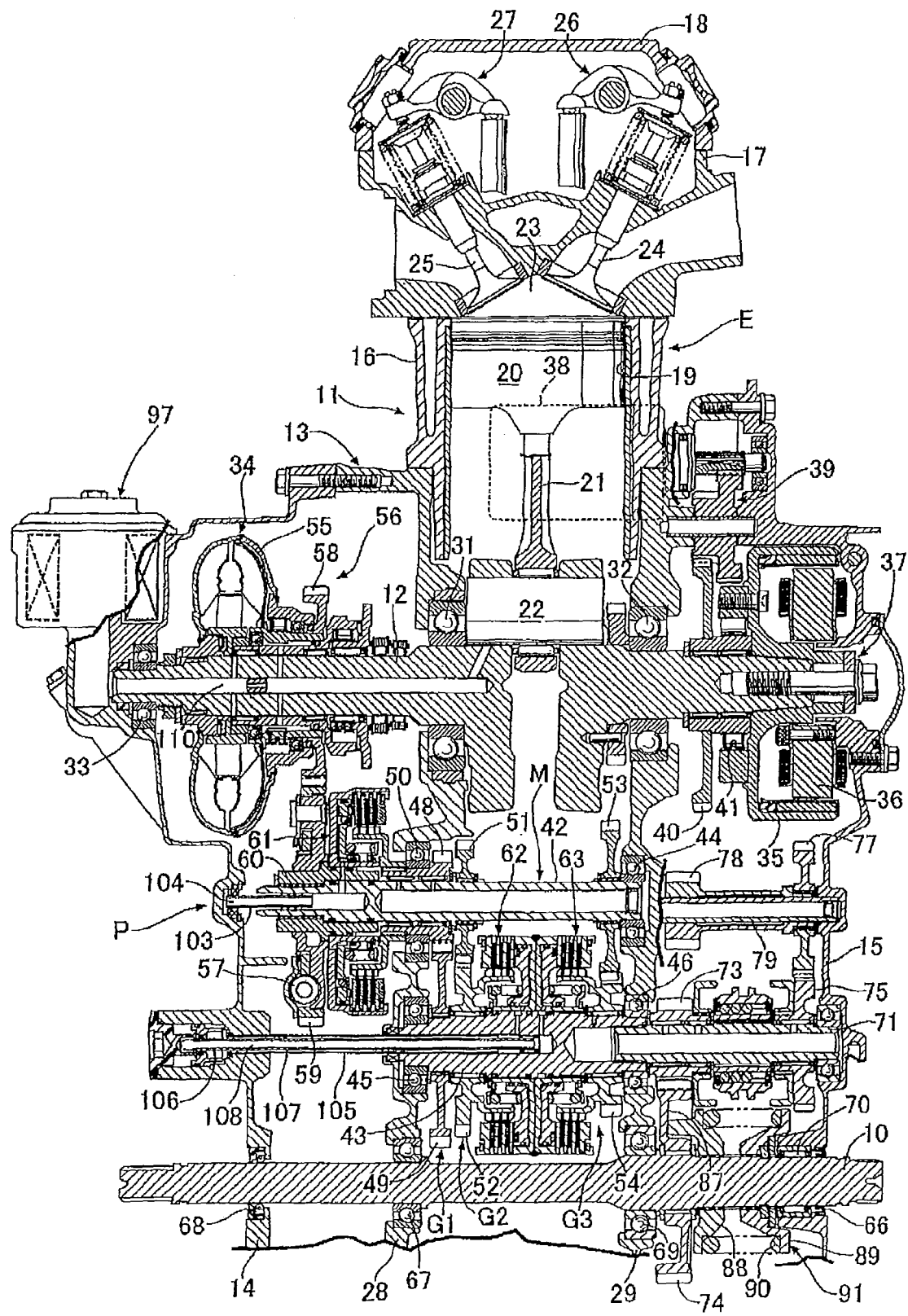
FIG. 2 is a sectional view taken along line 2-2 of FIG. 1.

An embodiment of the present invention is described with reference to FIGS. 1 to 4. As shown in FIGS. 1 and 2, this power unit P includes an engine E, and a speed change gear M which can change the speed of rotational power inputted thereto from the engine E stepwise. The rotational power transmitted from the speed change gear M is outputted from a final shaft 10.

An engine body 11 of the engine E includes a crankcase 13 for supporting a crankshaft 12 for rotation thereon, a first crankcase cover 14 fastened to the crankcase 13 and covering one side of the crankcase 13 in a direction along an axial line of the crankshaft 12, a second crankcase cover 15 fastened to the crankcase 13 and covering the other side of the crankcase 13 in the direction along the axial line of the crankshaft 12, a cylinder block 16 coupled to an upper portion of the crankcase 13, a cylinder head 17 fastened to an upper portion of the cylinder block 16, and a head cover 18 coupled to an upper portion of the cylinder head 17.

This engine body 11 is configured such that the first crankcase cover 14 forms part of the front face of the engine body 11, and the second crankcase cover 15 forms part of the rear face of the engine body 11 and is carried on a vehicle such that the axial line of the crankshaft 12 extends along the forward and backward direction of the vehicle.

A piston 20 is fitted for sliding movement in a cylinder bore 19 provided on the cylinder block 16. The piston 20 is connected to the crankshaft 12 through a connecting rod 21 and a crank pin 22. A combustion chamber 23 to which a top portion of the piston 20 is exposed is formed between the cylinder block 16 and the cylinder head 17. An intake valve 24 for controlling the intake of air into the combustion chamber 23 and an exhaust valve 25 for controlling the exhaust of gas from the combustion chamber 23 are disposed for opening and closing movement on the cylinder head 17. The intake valve 24 and the exhaust valve 25 are biased in the valve closing direction by springs. Further, part of an intake side valve motion 26 for driving the intake valve 24 to open and close and part of an exhaust side valve motion 27 for driving the exhaust valve 25 to open and close are accommodated between the cylinder head 17 and the head cover 18.

The crankcase 13 is configured such that a first case half 28 on the front side and a second case half 29 on the rear side are fastened to each other at the coupling faces thereof extending along a plane which includes the axial line of the cylinder bore 19. The crankshaft 12 extends for rotation through the first and second case halves 28 and 29, and the ball bearings 31 and 32 are interposed between the first and second case halves 28 and 29 and the crankshaft 12, respectively. Further, the crankshaft 12 is supported at one end portion thereof for rotation on the first crankcase cover 14 through a ball bearing 33.

A torque converter 34 is mounted on the crankshaft 12 between the first case half 28 and the first crankcase cover 14 of the crankcase 13. Further, a rotor 35 is secured to the other end portion of the crankshaft 12 which projects from the second case half 29, and a stator 36 which cooperates with the rotor 35 to form a generator 37 is secured to the second crankcase cover 15.

A starter motor 38 having a rotational axial line parallel to the crankshaft 12 is attached to the second case half 29 of the crankcase 13. A driven gear wheel 40 which is an output end of a reduction gear train 39 connecting to the starter motor 38 is supported for relative rotation on the crankshaft 12. A one-way clutch 41 is interposed between the stator 36 of the generator 37 and the driven gear wheel 40.

The speed change gear M can vary the speed of the rotational power outputted from the crankshaft 12 stepwise and includes a main shaft 42 and a countershaft 43 supported for rotation on the crankcase 13 such that they have axial lines parallel to the crankshaft 12. The speed change gear M is built in the engine body 11.

The main shaft 42 is disposed left-upwardly of the crankshaft 12. The main shaft 42 extends on one end side thereof for rotation through the first case half 28 of the crankcase 13, and is supported on the other end side thereof for rotation on the second case half 29 of the crankcase 13 through a ball bearing 44. Meanwhile, the countershaft 43 is disposed left-downwardly of the main shaft 42. The countershaft 43 extends on one end side thereof for rotation through the first case half 28. A ball bearing 45 is interposed between the countershaft 43 and the first case half 28. Further, the countershaft 43 extends on the other end side thereof for rotation through the second case half 29. A ball bearing 46 is interposed between the countershaft 43 and the second case half 29.

A gear train having a plurality of shift stages established alternatively is provided between the main shaft 42 and the countershaft 43. In the present embodiment, the first, second and third speed gear trains G1, G2 and G3 are provided between the main shaft 42 and the countershaft 43.

The first speed gear train G1 includes a first speed driving gear wheel 48 and a first speed driven gear wheel 49. The first speed driving gear wheel 48 is supported for relative rotation on the main shaft 42 and extends for rotation through the first case half 28 of the crankcase 13. The first speed driven gear wheel 49 is secured to the countershaft 43 and meshes with the first speed driving gear wheel 48. A ball bearing 50 is interposed between the first speed driving gear wheel 48 and the first case half 28.

Meanwhile, the second speed gear train G2 includes a second speed driving gear wheel 51 and a second speed driven gear wheel 52. The second speed driving gear wheel 51 is secured to the main shaft 42 at a position neighboring with the first speed driving gear wheel 48. The second speed driven gear wheel 52 is supported for relative rotation on the countershaft 43 and meshes with the second speed driving gear wheel 51. The third speed gear train G3 includes a third speed driving gear wheel 53 and a third speed driven gear wheel 54. The third speed driving gear wheel 53 is secured to the main shaft 42 at a position neighboring with the second case half 29. The third speed driven gear wheel 54 is supported for relative rotation on the countershaft 43 and meshes with the third speed driving gear wheel 53.

A turbine blade wheel 55 of the torque converter 34 mounted at an end portion of the crankshaft 12 is connected to the main shaft 42 through a primary reduction gear mechanism 56 and a damper spring 57. The primary reduction gear mechanism 56 includes a primary driving gear wheel 58 secured to the turbine blade wheel 55, and a primary driven gear wheel 59 supported for relative rotation on a power speed change gear cylindrical shaft 60 secured to the main shaft 42 in such a manner as to coaxially surround the main shaft 42 and meshing with the primary driving gear wheel 58. A damper spring 57 is interposed between the primary driven gear wheel 59 and the power speed change gear cylindrical shaft 60.

A first multiple disk clutch 61 of the hydraulic type is interposed between the power speed change gear cylindrical shaft 60 and the first speed driving gear wheel 48, and is placed into a power transmitting state in response to an action of a hydraulic pressure. Meanwhile, a second multiple disk clutch 62 of the hydraulic type is interposed between the second speed driven gear wheel 52 and the countershaft 43, and is placed into a power transmitting state in response to an action of a hydraulic pressure. A third multiple disk clutch 63 of the hydraulic type is interposed between the third speed driven gear wheel 54 and the countershaft 43 and is placed into a power transmitting state in response to an action of a hydraulic pressure. The second and third multiple disc clutches 62 and 63 are disposed between the second and third speed gear trains G2 and G3 such that a clutch outer 64 provided commonly in the second and third multiple disc clutches 62 and 63 is secured to the countershaft 43.

If the first multiple disk clutch 61 is placed into a power transmitting state, then rotational power is transmitted from the main shaft 42 to the countershaft 43 through the first speed gear train G1. If the second multiple disk clutch 62 is placed into a power transmitting state, then the rotational power is transmitted from the main shaft 42 to the countershaft 43 through the second speed gear train G2. If the third multiple disk clutch 63 is placed into a power transmitting state, then the rotational power is transmitted from the main shaft 42 to the countershaft 43 through the third speed gear train G3. In other words, by changing over the connection-disconnection state of the first to third multiple disc clutches 61 to 63 by hydraulic control, the first, second and third speed gear trains G1 to G3 are alternatively placed into an established state, and the rotational power is transmitted from the main shaft 42 to the countershaft 43 through an established gear train from among the first, second and third speed gear trains G1 to G3.

The final shaft 10 is disposed below the countershaft 43 such that it has an axial line parallel to the crankshaft 12, the main shaft 42 and the countershaft 43. The final shaft 10 extends on one end side thereof for rotation through the first case half 28, and a ball bearing 67 is interposed between the final shaft 10 and the first case half 28. The final shaft 10 extends at one end portion thereof for rotation through the first crankcase cover 14 such that an annular seal member 68 is interposed between the final shaft 10 and the first crankcase cover 14. Meanwhile, the final shaft 10 extends on the other end side thereof for rotation through the second case half 29, and a ball bearing 69 is interposed between the final shaft 10 and the second case half 29. The final shaft 10 extends on the other end thereof for rotation through the second crankcase cover 15, and a needle bearing 70 is interposed between the final shaft 10 and the second crankcase cover 15. An annular seal member 66 is interposed between the final shaft 10 and the second crankcase cover 15 outwardly of the needle bearing 70.

Figure 3:
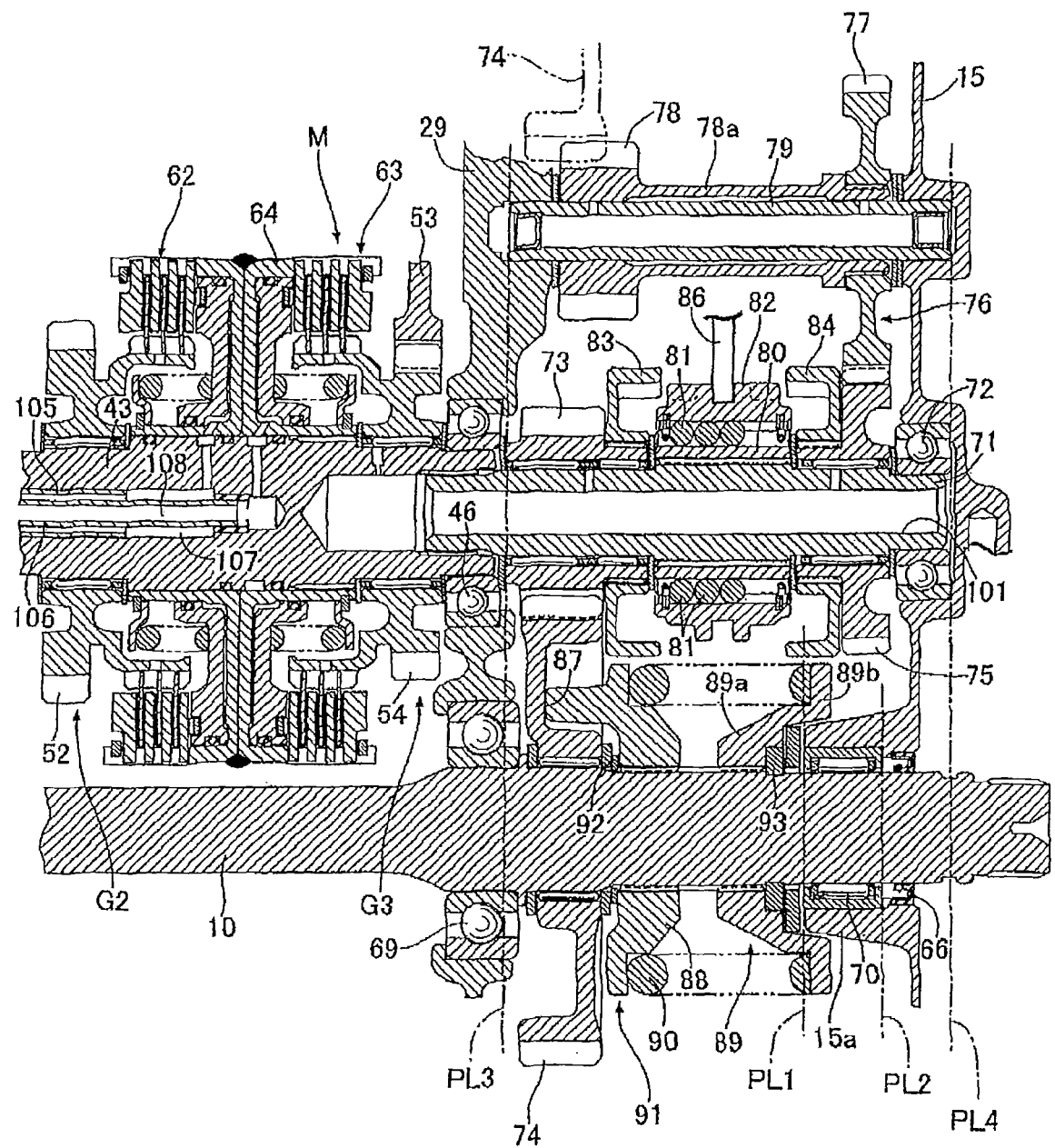
FIG. 3 is an enlarged view of essential part of FIG. 2.

Referring to FIG. 3, a rotary shaft 71 is connected at one end thereof coaxially against rotation at the other end of the countershaft 43, and is supported at the other end portion thereof for rotation on the second crankcase cover 15 through a ball bearing 72.

A forward direction driving gear wheel 73 is supported for forward rotation at a portion of the rotary shaft 71 rather close to the second case half 29, and a damper gear wheel 74 which meshes with the forward direction driving gear wheel 73 is supported for relative rotation on the final shaft 10. Further, a reverse direction driving gear wheel 75 is supported for relative rotation at a portion of the rotary shaft 71 rather close to the second crankcase cover 15. The reverse direction driving gear wheel 75 forms part of a reverse gear train 76 for transmitting the rotational power from the countershaft 43 in the reverse direction to the final shaft 10. The reverse gear train 76 includes a first idle gear wheel 77 which meshes with the reverse direction driving gear wheel 75, a second idle gear wheel 78 for rotating together with the first idle gear wheel 77, and a damper gear wheel 74 meshing with the second idle gear wheel 78.

The first and second idle gear wheels 77 and 78 are supported for rotation on an idle shaft 79 disposed right-upwardly of the final shaft 10 such that they have an axial line parallel to the countershaft 43 and the final shaft 10. The idle shaft 79 is fitted and supported at one end portion thereof in and by the second case half 29, and is fitted and supported at the other end portion thereof in and by the second crankcase cover 15. Besides, the idle shaft 79 is disposed such that it partly overlaps with the main shaft 42 as viewed in an axial direction thereof.

A cylindrical portion 78a is provided integrally on the second idle gear wheel 78 meshing with the damper gear wheel 74 in such a manner that it coaxially surrounds the idle shaft 79 and is supported for rotation by the idle shaft 79. The first idle gear wheel 77 is secured to an outer periphery of the cylindrical portion 78a.

A cylindrical sleeve 80 is secured to the rotary shaft 71 between the forward direction driving gear wheel 73 and the reverse direction driving gear wheel 75, and coaxially surrounds the rotary shaft 71. A shifter 82 is disposed for relative movement to the sleeve 80 in the axial direction but against relative rotation to the sleeve 80 around the axial line, and surrounds the sleeve 80. A plurality of balls 81 are interposed between the shifter 82 and each of a plurality of locations of the sleeve 80 which are spaced from each other in a circumferential direction of the sleeve 80. A pair of locking members 83 and 84 is secured to the forward direction driving gear wheel 73 and the reverse direction driving gear wheel 75, respectively, in such a manner as to oppose to the opposite ends of the shifter 82 in the axial direction.

The shifter 82 is embraced at an outer periphery thereof by a shift fork 86 engaged with the outer periphery of the shift drum 85 (see FIG. 1). When the shift fork 86 moves in the axial direction of the rotary shaft 71 in response to rotation of a shift drum 85, the shifter 82 moves between a position at which the shifter 82 is engaged with the locking member 83 to couple the forward direction driving gear wheel 73 against relative rotation to the rotary shaft 71 and another position at which the shifter 82 engages with the locking member 84 to couple the reverse direction driving gear wheel 75 against relative rotation to the rotary shaft 71. In a state where the shifter 82 is positioned at an intermediate position, it does not engage with any of the locking members 83 and 84.

In particular, the shifter 82 can be alternatively changed over by movement in the axial direction thereof among a state where the rotational power in the forward direction from the countershaft 43 is transmitted to the damper gear wheel 74, another state where the rotational power in the reverse direction from the countershaft 43 is transmitted to the damper gear wheel 74 through the reverse gear train 76 and a further state where the rotational power from the countershaft 43 is not transmitted to the damper gear wheel 74.

On the final shaft 10 between the second case half 29 and the second crankcase cover 15, a buffering device 91 is provided. The buffering device 91 includes the damper gear wheel 74 supported for relative rotation on the final shaft 10, a lifter 88 coupled against relative rotation but for relative movement in the axial direction to the final shaft 10 and engaged by a cam 87 provided on one face of the damper gear wheel 74, a spring retainer 89 supported on the final shaft 10 at a position spaced from the lifter 88 in the axial direction, and a coil spring 90 provided between the lifter 88 and the spring retainer 89 for exerting spring force for biasing the lifter 88 toward the damper gear wheel 74 side.

The lifter 88 is spline coupled to the final shaft 10, and the cam 87 recessed away from the lifter 88 is formed on an opposing face of the damper gear wheel 74 to the lifter 88. A driven projection 88a is provided in a projecting manner on the lifter 88 for engagement with the cam 87. A retaining ring 92 is mounted on the outer periphery of the final shaft 10 for engagement with an inner peripheral portion of the lifter 88 from the damper gear wheel 74 side, and stops a movement end of the lifter 88 to the damper gear wheel 74 side.

The spring retainer 89 is formed such that it has an arm-like portion 89a which is spline coupled at an end portion thereof adjacent the lifter 88 to the final shaft 10 and is open to the opposite side to the lifter 88, and a flange portion 89b connecting to an outer periphery of the open end of the arm-like portion 89a for receiving the coil spring 90.

A retaining ring 93 is disposed in the arm-like portion 89a and mounted on the outer periphery of the final shaft 10. The retaining ring 93 serves as a positioning member for stopping an end of movement of the spring retainer 89 away from the lifter 88 to define a position of the spring retainer 89 in the axial direction of the final shaft 10.

Incidentally, a tubular bearing housing 15a is formed integrally in a projecting manner on an inner face of the second crankcase cover 15 which is a shaft supporting member for supporting the other end portion of the final shaft 10 for rotation and projects at part thereof into the arm-like portion 89a of the spring retainer 89. The needle bearing 70 is disposed such that it overlaps at least at part thereof with the arm-like portion 89a as viewed in a direction perpendicular to the axial direction of the final shaft 10. The needle bearing 70 is a bearing member interposed between the bearing housing 15a and the final shaft 10. In particular, at least part of the arm-like portion 89a (in the present embodiment, part of the arm-like portion 89a) is disposed between two imaginary planes PL1 and PL2 (see FIG. 3) which extend perpendicularly to the axial line of the final shaft 10 and pass the opposite ends of the needle bearing 70 in the axial direction.

Besides, the buffering device 91 is disposed on the final shaft 10 between the second case half 29 and the second crankcase cover 15 such that it is positioned between a pair of imaginary planes PL3 and PL4 extending perpendicularly to the axial line of the idle shaft 79 and pass the opposite ends of the idle shaft 79. Meanwhile, the idle shaft 79 is disposed at a position right-upwardly of the buffering device 91 at which it overlaps at least at part thereof with the buffering device 91 as viewed in plan. In particular, part of the buffering device 91 is disposed between the two straight lines L1 and L2 extending downwardly from the opposite ends of the idle shaft 79 in the horizontal direction as seen in FIG. 1 on a projection view of the final shaft 10 and the idle shaft 79 on a plane perpendicular to the axial lines.

Figure 4:
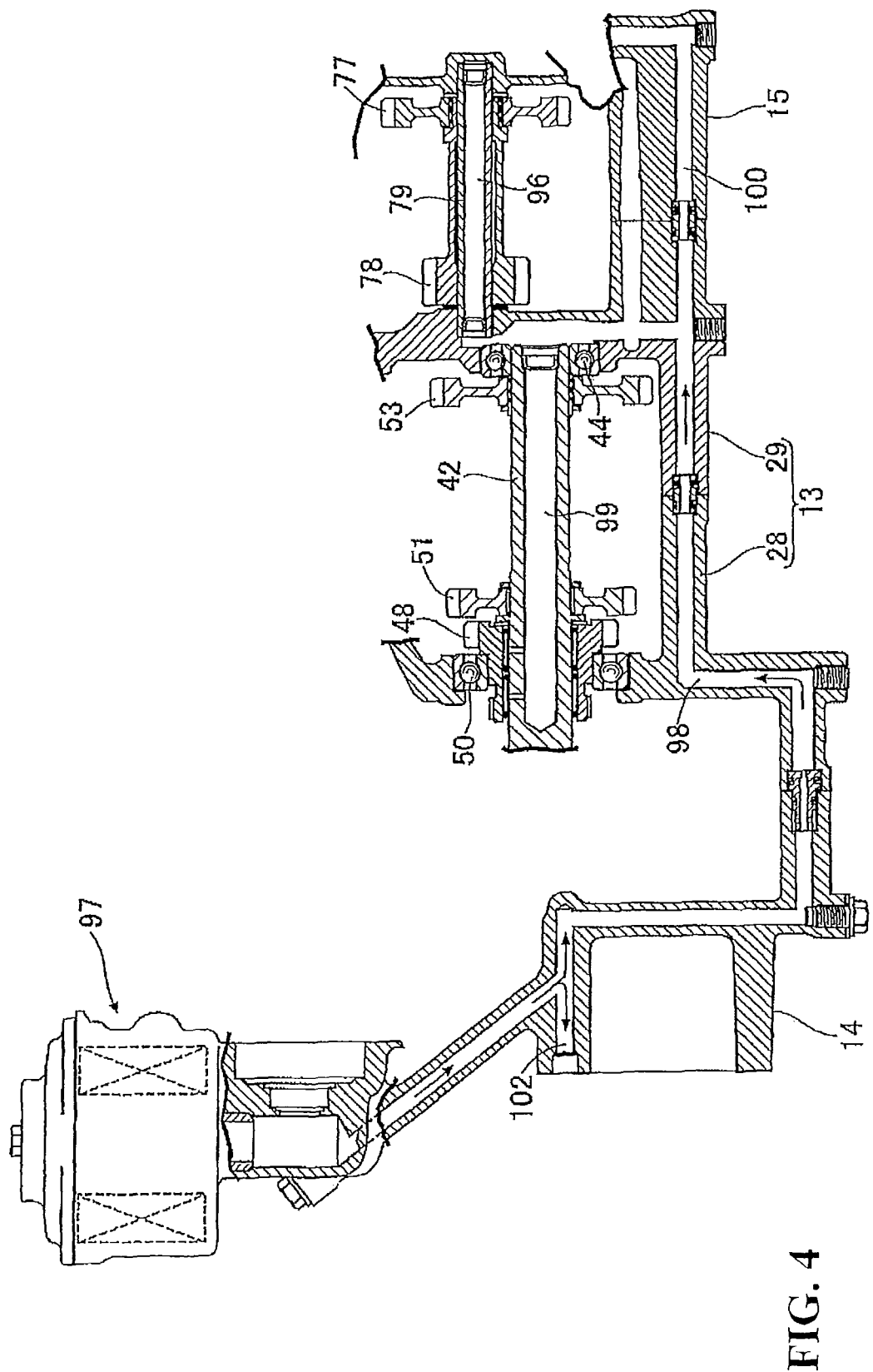
FIG. 4 is a sectional view showing part of a lubricating oil supplying system according to an embodiment of the present invention.

Referring to FIG. 4, a first lubricating oil path 96 for supplying oil therethrough to locations between the idle shaft 79 and the first and second idle gear wheels 77 and 78 supported for rotation on the idle shaft 79 is provided coaxially on the idle shaft 79. Meanwhile, an oil pump (not shown) is built in the engine body 11 and is driven to rotate by power transmitted thereto from the crankshaft 12. The oil discharged from the oil pump is purified by an oil filter 97 disposed in the first crankcase cover 14, and the oil from the oil filter 97 is introduced into the first lubricating oil path 96 through an oil supplying path 98 provided in the first crankcase cover 14, the first case half 28 and the second case half 29. Further, the oil from the oil filter 97 is also supplied to an oil path 110 (see FIG. 2) provided in the crankshaft 12 for supplying oil therethrough to the torque converter 34 and supplying lubricating oil to the circumference of the crank pin 22.

Meanwhile, a second lubricating oil path 99 is provided coaxially on the other end side of the main shaft 42 such that it is communicated with an intermediate portion of the oil supplying path 98. Therefore, supplying of oil between the first speed driving gear wheel 48 and the main shaft 42 is carried out from the second lubricating oil path 99. Further, a first branch oil path 100 is branched from an intermediate portion of the oil supplying path 98 and provided in the second case half 29 and the second crankcase cover 15. Oil from the first branch oil path 100 is introduced to a third lubricating oil path 101 (see FIG. 3), which is provided in the rotary shaft 71 such that oil is provided to locations between the forward direction driving gear wheel 73 and reverse direction driving gear wheel 75 and the rotary shaft 71.

Incidentally, a hydraulic pressure controlling apparatus (not shown) for changing over the first to third multiple disc clutches 61 to 63 between connection and disconnection is disposed on the first crankcase cover 14. The oil is introduced into the hydraulic pressure controlling apparatus through a second branch oil path 102 branched from the oil supplying path 98 and provided in the first crankcase cover 14.

As shown in FIG. 2, a first oil supplying pipe 103 is fitted at one end thereof liquid-tight in the first crankcase cover 14 and is fitted at the other end thereof liquid-tight in the other end of the main shaft 42. Thus, a first controlling oil path 104 for introducing oil for the controlling oil pressure for changing over the first multiple disk clutch 61 between connection and disconnection is formed by the first oil supplying pipe 103 and the main shaft 42, and is connected to the hydraulic pressure controlling apparatus.

Further, a second oil supplying pipe 105 is fitted at one end thereof liquid-tight in the first crankcase cover 14, and a third oil supplying pipe 106 coaxially inserted in the second oil supplying pipe 105 is fitted at one end thereof liquid-tight in the first crankcase cover 14. The third oil supplying pipe 106 is fitted at the other end thereof liquid-tight in the one end side of the main shaft 42 in such a manner that a third controlling oil path 108 for introducing oil for the controlling oil pressure for changing over the third multiple disk clutch 63 between connection and disconnection is formed together with the main shaft 42. Meanwhile, the second oil supplying pipe 105 is fitted at the other end thereof liquid-tight in the one end side of the main shaft 42 such that a second controlling oil path 107 for introducing oil for the controlling hydraulic pressure for changing over the second multiple disk clutch 62 between connection and disconnection is formed together with the third oil supplying pipe 106 and the main shaft 42. The second and third controlling oil paths 107 and 108 are connected to the hydraulic pressure controlling apparatus.

Operation of the present embodiment is described as follows. On the final shaft 10 for outputting rotational power from the power unit P, the buffering device 91 is provided. The buffering device 91 includes the damper gear wheel 74 supported for relative rotation on the final shaft 10, the lifter 88 coupled against rotation but for movement in the axial direction to the final shaft 10 and engaged by the cam 87 provided on one face of the damper gear wheel 74, the spring retainer 89 supported at a position on the final shaft 10 spaced from the lifter 88 in the axial direction, and the coil spring 90 provided between the lifter 88 and the spring retainer 89 in such a manner as to exert spring force for biasing the lifter 88 toward the damper gear wheel 74. This buffering device 91 is disposed on the final shaft 10 such that it is positioned between the imaginary planes PL3 and PL4 in pair which extend perpendicularly to the axial line of the idle shaft 79, on which the first and second idle gear wheels 77 and 78 (which form part of the reverse gear train 76 for transmitting rotational force in the reverse direction from the countershaft 43 to the damper gear wheel 74) are supported for rotation, and pass the opposite ends of the idle shaft 79.

Accordingly, while it is made possible for rotational power in the reverse direction from the countershaft 43 to be transmitted to the final shaft 10 through the reverse gear train 76, the length of the final shaft 10 is suppressed from becoming greater than the necessary length, thereby making compaction of the power unit P possible.

In addition, part of the buffering device 91 is disposed between the two straight lines L1 and L2 extending downwardly from the opposite ends of the idle shaft 79 in the horizontal direction on a projection view to a plane perpendicular to the axial lines of the final shaft 10 and the idle shaft 79. This also makes compaction of the power unit P possible.

Further, the spring retainer 89 is formed such that it has the arm-like portion 89*a* having an end portion thereof adjacent the lifter 88 spline coupled to the final shaft 10 and open to the reverse side to the lifter 88 and the flange portion 89*b* connecting to an outer periphery of the open end of the arm-like portion 89*a* in such a manner as to receive the coil spring 90. The retaining ring 93 engaging with the spring retainer 89 from the opposite side to the coil spring 90 is disposed in the arm-like portion 89*a* and mounted on the final shaft 10. Therefore, the space occupied by the buffering device 91 in the axial direction of the final shaft 10 can be set small.

Still further, since the bearing member overlapping at least at part thereof with the arm-like portion 89*a* as viewed in a direction perpendicular to the axial line of the final shaft 10 is interposed between the final shaft 10 and the bearing housing 15*a* of the second crankcase cover 15, it is possible to accommodate at least part of the bearing structure of the final shaft 10 in the arm-like portion 89*a* to reduce the axial length of the final shaft 10.

Still further, since the bearing member described above can be the needle bearing 70, the inner diameter of the arm-like portion 89*a* can be set small, and the space occupied by the buffering device 91 in a radial direction of the final shaft 10 can be made small.

Still further, the idle shaft 79 is disposed at a position above the buffering device 91 (which overlaps at least at part thereof with the buffering device 91 as viewed in plan) and the first lubricating oil path 96 for supplying oil therethrough to the locations between idle shaft 79 and the first and second idle gear wheels 77 and 78 supported for rotation on the idle shaft 79 is provided coaxially in the idle shaft 79. Therefore, it is possible to allow oil, which has lubricated the first and second idle gear wheels 77 and 78, to drop to the buffering device 91 side, and the buffering device 91 can be lubricated while making it unnecessary to provide an oil path for supplying oil to the buffering device 91 therethrough in the final shaft 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit for a vehicle, comprising:
 a buffering device provided on a final shaft parallel to a countershaft of a speed change gear which is configured to change a speed resulting from rotational power inputted from an engine stepwise, wherein the buffering device includes:
  a damper gear wheel supported for relative rotation on the final shaft,
  a lifter coupled against relative rotation but for relative movement in an axial direction on the final shaft and engaged by a cam provided on one face of the damper gear wheel,
  a spring retainer supported at a position on the final shaft spaced apart from the lifter, and
  a coil spring provided between the lifter and the spring retainer in such a manner as to exert spring force for biasing the lifter toward the damper gear wheel,
 wherein the power unit carries out changeover between a state where the rotational power in a forward direction from the countershaft is transmitted to the damper gear wheel and another state wherein the rotational power in a reverse direction from the countershaft is transmitted to the damper gear wheel through a reverse gear train including idle gear wheels supported for rotation on the countershaft and an idle shaft extending in parallel to the final shaft, wherein the buffering device is disposed on the final shaft and positioned between a pair of imaginary planes, the pair of imaginary planes extending perpendicularly to an axial line of the idle shaft and passing opposite ends of the idle shaft, wherein the spring retainer includes:
 a coupling portion having a coupling end adjacent the lifter and spline coupled to the final shaft, the coupling portion being open to an opposite side to the lifter; and
 a flange portion connected to an outer periphery of an open end of the coupling portion and receiving the coil spring, wherein a positioning member engaging with the spring retainer from an opposite side of the spring retainer to the coil spring is mounted on the final shaft and disposed in the coupling portion, the positioning member is located closer to the lifter than the flange portion is, and the entire positioning member is located in front of the entire flange portion in a direction that is along the axial direction of the final shaft and faces the lifter, wherein a bearing member at least partially overlaps with the coupling portion as viewed in a direction perpendicular to an axial line of the final shaft, and is interposed between the final shaft and a shaft supporting member which supports the final shaft for rotation thereon, wherein the bearing member is a needle bearing, wherein a rotary shaft is connected at one end thereof coaxially against rotation at an end of the countershaft, wherein the buffering device and a reverse gear train are disposed within a width of the rotary shaft, and wherein a retaining ring is disposed in the coupling portion and mounted on an outer periphery of the final shaft, and the retaining ring serves as a positioning member for stopping the spring retainer and the final shaft.

2. The power unit for a vehicle according to claim 1, wherein the idle shaft is disposed above the buffering device, the idle shaft at least partially overlaps with the buffering device as viewed in plan, and a lubricating oil path for supplying oil therethrough to a location between the idle shaft and the idle gear wheels is provided coaxially in the idle shaft.

3. The power unit for a vehicle according to claim 2, wherein the buffering device is disposed between two straight lines extending downwardly from the opposite ends of the idle shaft in a horizontal direction on a projection view to a plane perpendicular to the axial line of the final shaft and the axial line of the idle shaft.

4. The power unit for a vehicle according to claim 1, wherein the buffering device is disposed between two straight lines extending downwardly from the opposite ends of the idle shaft in a horizontal direction on a projection view to a plane perpendicular to an axial line of the final shaft and the axial line of the idle shaft.

5. The power unit for a vehicle according to claim 1, wherein the lifter and the spring retainer are supported on a same spline.

6. The power unit for a vehicle according to claim 1, wherein the flange portion is located at an outermost end of the outer periphery of the coupling portion, the coupling portion is located closer to the lifter than the flange portion is, and the coupling portion is located closer to the lifter than the positioning member is.

7. A power unit of a vehicle, comprising:
a buffering device provided on a final shaft parallel to a countershaft of a speed change gear, wherein the buffering device includes:
 a damper gear wheel supported for relative rotation on the final shaft,
 a lifter spline-coupled to and surrounding the final shaft, and engaged with a cam on the damper gear wheel,
 a spring retainer spline-coupled to and surrounding the final shaft, and spaced apart from the lifter, and
 a coil spring against the lifter and the spring retainer and exerting spring force for biasing the lifter toward the damper gear wheel, wherein the power unit carries out changeover between a state where the rotational power in a forward direction from the countershaft is transmitted to the damper gear wheel and another state wherein the rotational power in a reverse direction from the countershaft is transmitted to the damper gear wheel through a reverse gear train including idle gear wheels supported for rotation on the countershaft and an idle shaft extending in parallel to the final shaft, wherein the buffering device is disposed on the final shaft and positioned between a pair of imaginary planes, the pair of imaginary planes extending perpendicularly to an axial line of the idle shaft and passing opposite ends of the idle shaft, wherein the spring retainer includes:
 a coupling portion spline-coupled to the final shaft at a coupling end; and
 a flange portion extending from the coupling portion outwardly toward a radial direction of the final shaft, the flange portion receiving the coil spring, and wherein a positioning member engages with the spring retainer from a side of the coupling portion facing away from the lifter, and is mounted on the final shaft and disposed in the coupling portion, the positioning member is located closer to the lifter than the flange portion is, and the entire positioning member is located in front of the entire flange portion in a direction that is along an axial direction of the final shaft and faces the lifter, wherein a bearing member at least partially overlaps with the coupling portion as viewed in a direction perpendicular to an axial line of the final shaft, and is interposed between the final shaft and a shaft supporting member supporting the final shaft for rotation thereon, wherein the bearing member is a needle bearing wherein a rotary shaft is connected at one end thereof coaxially against rotation at an end of the countershaft, wherein the buffering device and a reverse gear train are disposed within a width of the rotary shaft, and wherein a retaining ring is disposed in the coupling portion and mounted on an outer periphery of the final shaft, and the retaining ring serves as a positioning member for stopping the spring retainer and the final shaft.

8. The power unit for a vehicle according to claim 7, wherein the idle shaft is disposed above the buffering device, the idle shaft at least partially overlaps with the buffering device as viewed in plan, and a lubricating oil path for supplying oil therethrough to a location between the idle shaft and the idle gear wheels is provided coaxially in the idle shaft.

9. The power unit for a vehicle according to claim 7, wherein the buffering device is disposed between two straight lines extending downwardly from the opposite ends of the idle shaft in a horizontal direction on a projection view to a plane perpendicular to an axial line of the final shaft and the axial line of the idle shaft.

10. The power unit for a vehicle according to claim 7, wherein the lifter and the spring retainer are supported on a same spline.

11. The power unit for a vehicle according to claim 7, wherein the flange portion is located at an outermost end of the outer periphery of the coupling portion, and the coupling portion is located closer to the lifter than the flange portion is, and the coupling portion is located closer to the lifter than the positioning member is.

* * * * *